United States Patent
Bostwick

(10) Patent No.: US 6,727,611 B2
(45) Date of Patent: Apr. 27, 2004

(54) COOLING JACKET FOR ELECTRIC MACHINES

(75) Inventor: Peter K. Bostwick, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/156,289

(22) Filed: May 28, 2002

(65) Prior Publication Data

US 2003/0222519 A1 Dec. 4, 2003

(51) Int. Cl.[7] .................................................. H02K 9/00
(52) U.S. Cl. .............................. 310/58; 310/59; 310/89
(58) Field of Search ................................ 310/52–58, 89

(56) References Cited

U.S. PATENT DOCUMENTS

| | | | |
|---|---|---|---|
| 2,862,120 A | | 11/1958 | Onsrud |
| 3,601,884 A | | 8/1971 | Kemeny |
| 4,516,044 A | | 5/1985 | Bone |
| 4,854,373 A | | 8/1989 | Williams |
| 4,912,350 A | * | 3/1990 | Parshall et al. ............. 310/271 |
| 5,592,039 A | | 1/1997 | Guardiani |
| 5,808,386 A | * | 9/1998 | Willyoung ................... 310/52 |
| 5,859,482 A | | 1/1999 | Crowell et al. |
| 5,906,236 A | | 5/1999 | Adams et al. |
| 5,929,543 A | | 7/1999 | Zeyen et al. |
| 5,939,808 A | | 8/1999 | Adames |
| 5,997,261 A | | 12/1999 | Kershaw et al. |
| 6,133,659 A | | 10/2000 | Rao |
| 6,300,693 B1 | | 10/2001 | Poag et al. |

OTHER PUBLICATIONS

Electrical Apparatus Service Association, Inc., *Principles of Large AC Motors*, 2000 (The motor shown in Fig. 6 is admitted to be prior art.).

Faye C. McQuiston and Jerald D. Parker, *Heating, Ventilating, and Air Conditioning: Analysis and Design*, before 1993, p. 619, Third Edition, John Wiley & Sons Publishers.

Frank P. Incropera and David P. DeWitt, *Fundamentals of Heat and Mass Transfer*, 1990, pp. 119–121, Third Edition, John Wiley & Sons Publishers.

J.P. Holman, *Heat Transfer*, 1981, pp. 41–44, Fifth Edition, McGraw–Hill Book Company.

William C. Reynolds and Henry C. Perkins, *Engineering Thermodynamics*, 1977, pp. 567–568, Second Edition, McGraw Hill Book Company.

* cited by examiner

*Primary Examiner*—Thanh Lam
(74) *Attorney, Agent, or Firm*—Senniger, Powers, Leavitt & Roedel

(57) ABSTRACT

A cooling jacket for cooling the stator of an electric machine. The jacket includes a cooling jacket body having a cylindric inner surface defining a cavity for receiving the stator of a motor, axial flow passages in the body for the flow of a coolant, and end caps connected to opposite ends of the body. Coolant flows through an inlet in one of the end caps and is directed through the flow passages along at least one serpentine path to an outlet. Each flow passage has a cross sectional shape defined entirely by three or more substantially linear sides.

27 Claims, 9 Drawing Sheets

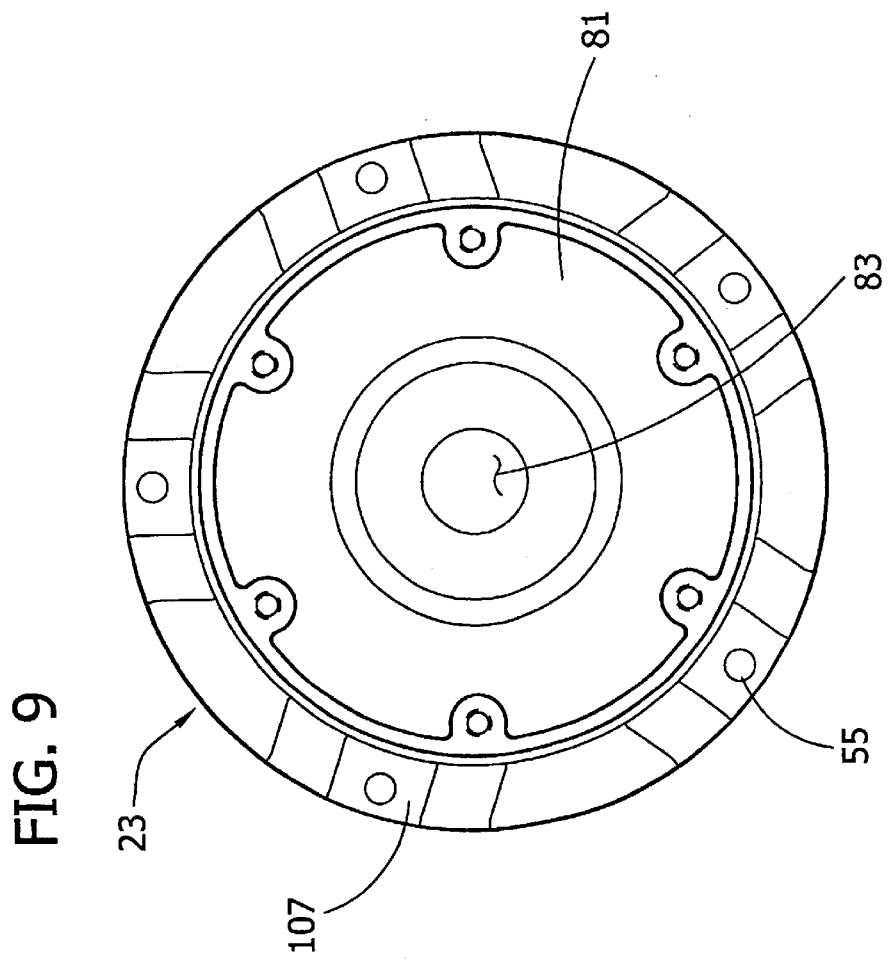

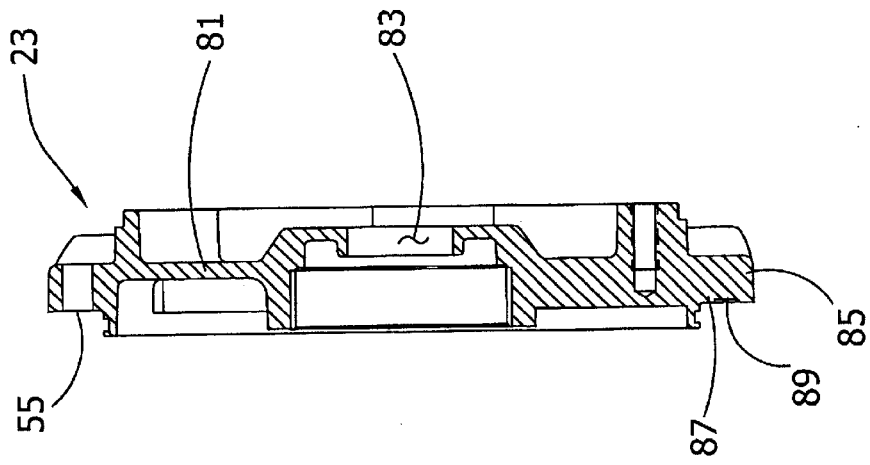
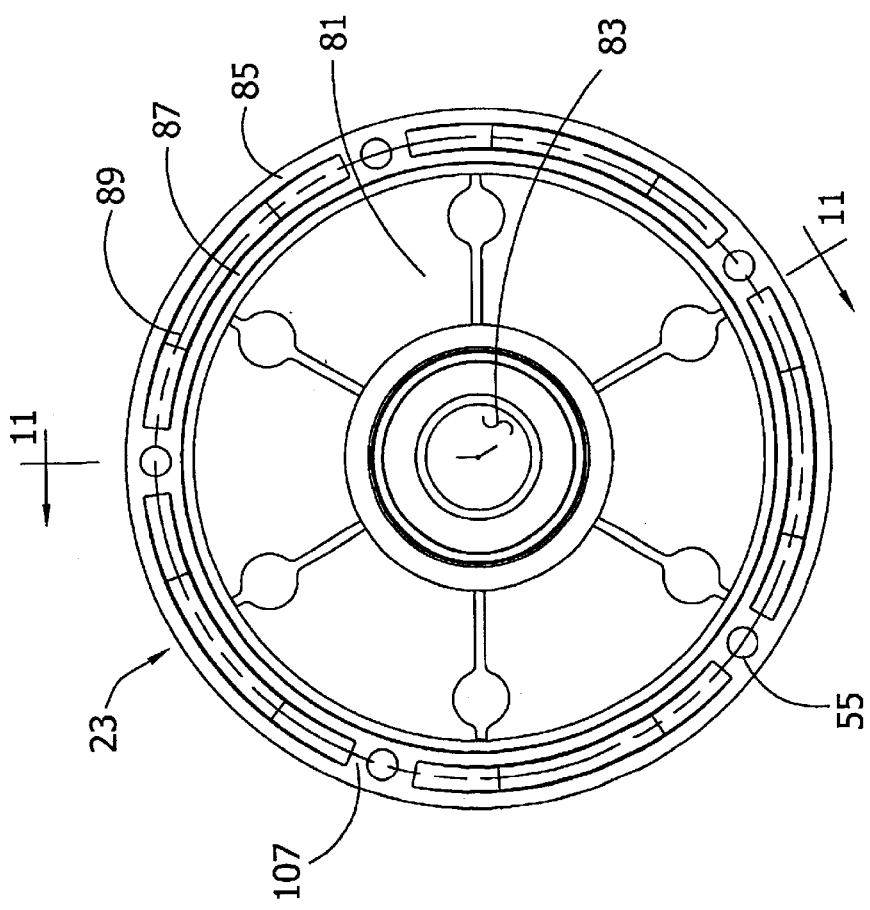

COOLING JACKET FOR ELECTRIC MACHINES

BACKGROUND OF THE INVENTION

This invention relates generally to systems for cooling electric machines and, more particularly, to a cooling jacket for cooling an electric motor and/or generator having high heat-dissipation requirements.

This invention is in the same field as U.S. Pat. No. 6,300,693, entitled "Electric Motor Cooling Jacket Assembly and Method of Manufacture", assigned to Emerson Electric Co., which is incorporated by reference herein for all purposes. The '693 patent discloses a cooling jacket having axial passages for the flow of coolant to cool the stator of an electric machine (a motor or generator), such as a brushless permanent magnet motor operating at high speeds and driven by fuel-powered turbines to generate electrical power. While the cooling jacket design described in the patent is generally satisfactory, the flow passage configuration used in the design is not optimal from the standpoint of cost and heat transfer efficiency.

SUMMARY OF THE INVENTION

Among the several objectives of this invention is the provision of an improved cooling jacket for an electric machine (e.g., motor and/or generator); the provision of such a jacket which comprises an assembly of parts which are relatively economical to manufacture and easy to assemble; the provision of such a jacket which is adapted for the efficient cooling of an electric machine having high heat dissipation requirements; and the provision of such a jacket having coolant flow passages which are designed to minimize the quantity of materials used while maximizing heat transfer efficiency.

In general, a cooling jacket of the present invention is used for cooling the stator of an electric machine. The jacket comprises a jacket body having co-axial inner and outer surfaces defining a generally cylindric cavity for receiving the stator so that the stator is in heat transfer contact with the inner surface. The body has axial flow passages for the flow of coolant therethrough, each flow passage having a radial cross sectional shape defined entirely by three or more substantially linear sides. A first end cap is connected to one end of the cooling jacket body and defines an annular conduit around the body in fluid communication with the flow passages. A second end cap is connected to the opposite end of the cooling jacket body and defines an annular conduit around the body in fluid communication with the flow passages. An inlet is provided on one or the other of the end caps for flow of coolant into a respective conduit, and an outlet is provided on one or the other of the end caps for flow of coolant out of a respective conduit. Barriers in the conduits direct fluid along a path from the inlet through the flow passages to the outlet.

In another aspect of the invention, the axial flow passages in the body have a radial cross sectional rectangular shape defined by four substantially linear sides. The substantially linear sides are joined at four corners, each corner having a small radius of curvature such that the perimeter of the flow passage is not reduced by more than 25% compared to the same flow passage having square corners. The barriers in the conduits direct the coolant along a single serpentine path from the inlet through the flow passages to the outlet.

In another aspect of the invention, the flow path comprises a plurality of parallel flow sections extending axially of the cooling jacket body between the conduits. Each flow section of the path comprises a group of flow passages and each section has an inlet end for entry of coolant into a respective group of flow passages and an outlet end for exit of coolant from the flow passages. Ramps in the conduits extend across the inlet and outlet ends of the parallel flow sections for maintaining a substantially uniform static pressure in the conduits across the flow passages of each section.

In another aspect of the invention, the barriers direct all fluid entering the inlet to flow through the flow passages along only one serpentine path starting at the inlet and ending at the outlet and extending around substantially the entire circumference of the jacket body.

Other objects and features of the present invention will be in part apparent and in part pointed out hereinafter.

BRIEF DESCRIPTION OF THE DRAWINGS

FIG. 9 is a bottom plan view of a second end cap of the assembly;

FIG. 10 is a top plan view of the second end cap;

FIG. 11 is a sectional view taken on lines 11—11 of FIG. 10; and

Corresponding parts are designated by corresponding numbers and characters throughout the several views of the drawings.

DETAILED DESCRIPTION OF THE PREFERRED EMBODIMENT

Figure 1:
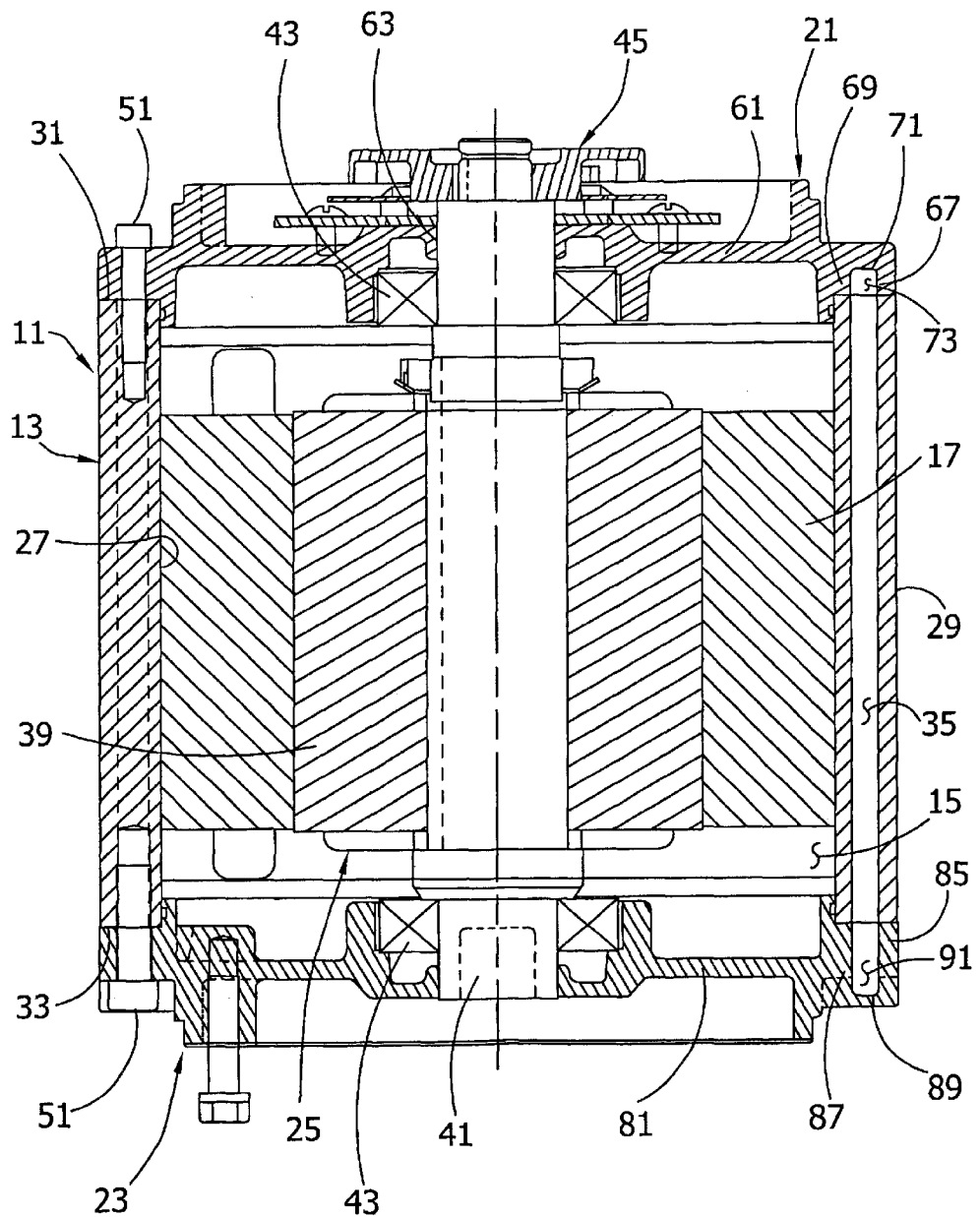
FIG. 1 is a vertical section of a cooling jacket assembly of the present invention.

Referring now to the drawings, and particularly to FIG. 1, a cooling jacket of the present invention is designated in its entirety by the reference numeral 11. The jacket includes a jacket body 13 defining a cavity 15 for receiving the stator 17 of an electric machine, and first and second end caps generally designated 21 and 23, respectively, connected to opposite ends of the body. (The term "electric machine" as used herein is intended to refer to a machine operating as a motor or as a generator.) By way of example, the cooling jacket 11 may be used to cool the motor of an electric vehicle, where heat transfer efficiencies and weight are important factors. A conventional rotor and shaft assembly, generally designated 25, is rotatable in the stator 17.

Figure 2A:
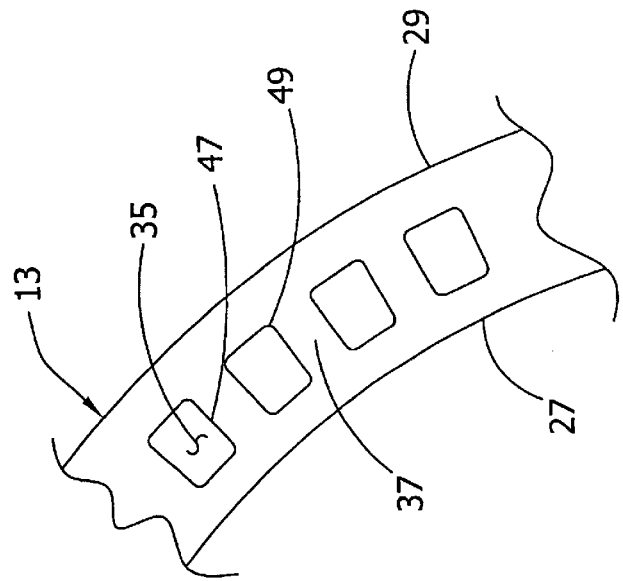
FIG. 2A is an enlarged plan view of a group of flow passages of the jacket body.
Figure 2:
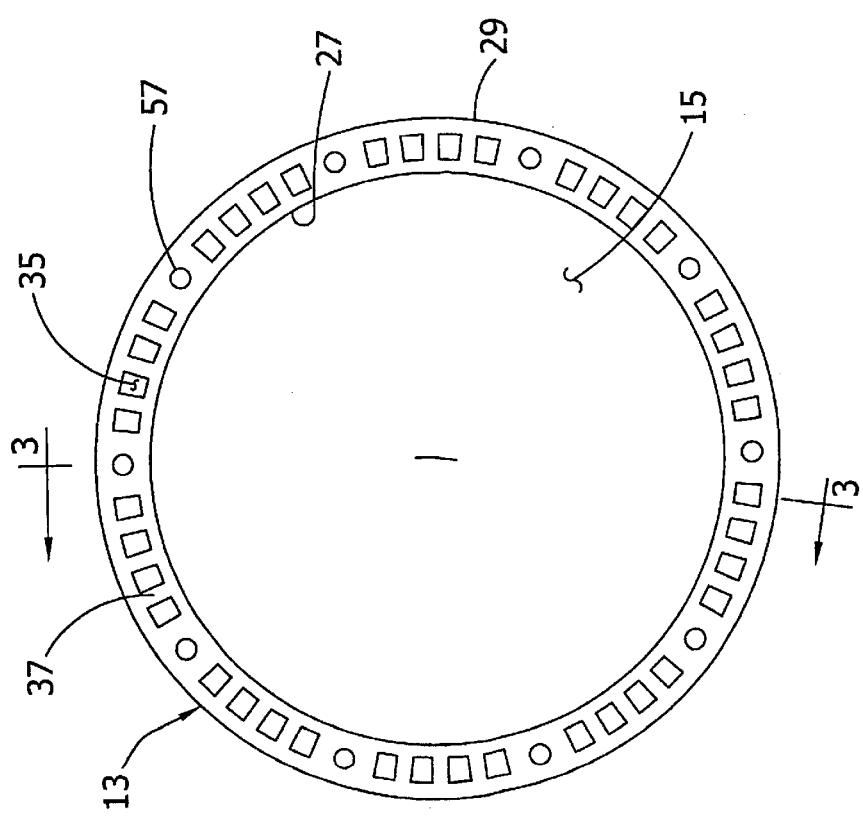
FIG. 2 is a top plan view of a jacket body of the cooling jacket.
Figure 3:
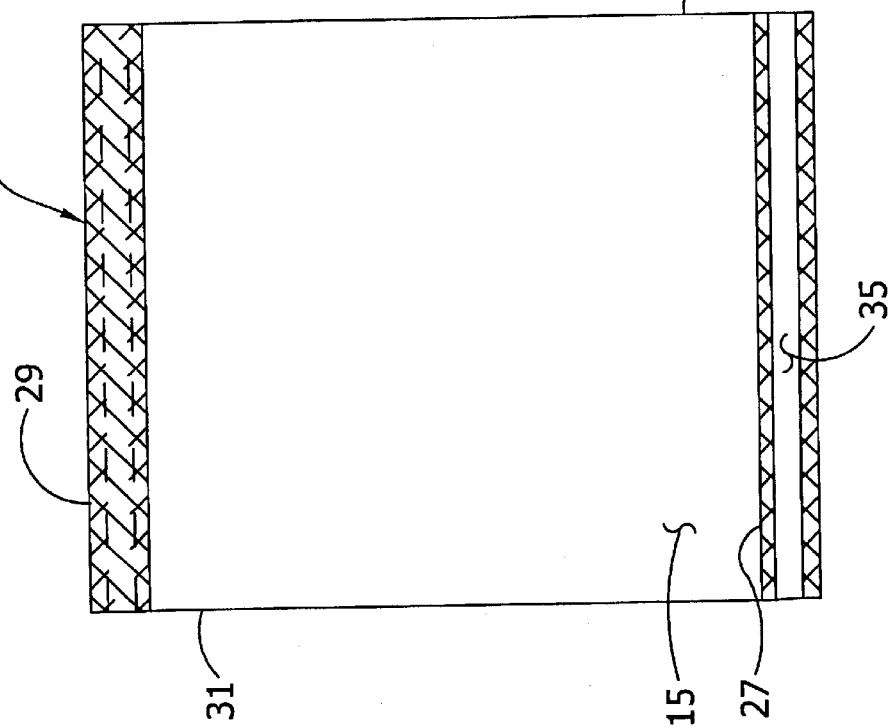
FIG. 3 is a sectional view taken on line 3—3 of FIG. 2.

Referring to FIGS. 1 thru 3, the jacket body 13 is of a thermally conductive material and has coaxial inner and outer surfaces, 27 and 29 respectively, and annular end faces 31 and 33 at opposite ends of the body. The inner surface 27 defines the stator cavity 15 and is in heat transfer contact with the laminated metal body of the stator 17 for drawing heat therefrom. The body 13 is formed with axial cooling passages 35 around its circumference divided into a plurality of groups, each group having a number of flow passages 35 therein, e.g., four, although this number can vary. As will be explained in more detail hereinafter, these groups define parallel sections of a serpentine flow path for the flow of coolant (e.g., oil or water) through the jacket 11 to effect the necessary cooling. In the embodiment shown, the jacket body 13 is a monolithic body of thermally conductive material, such as extruded or cast aluminum, but it is contemplated that the body could comprise separate inner and outer shells held in assembly, as in the aforementioned U.S. Pat. No. 6,300,693.

Figure 4:
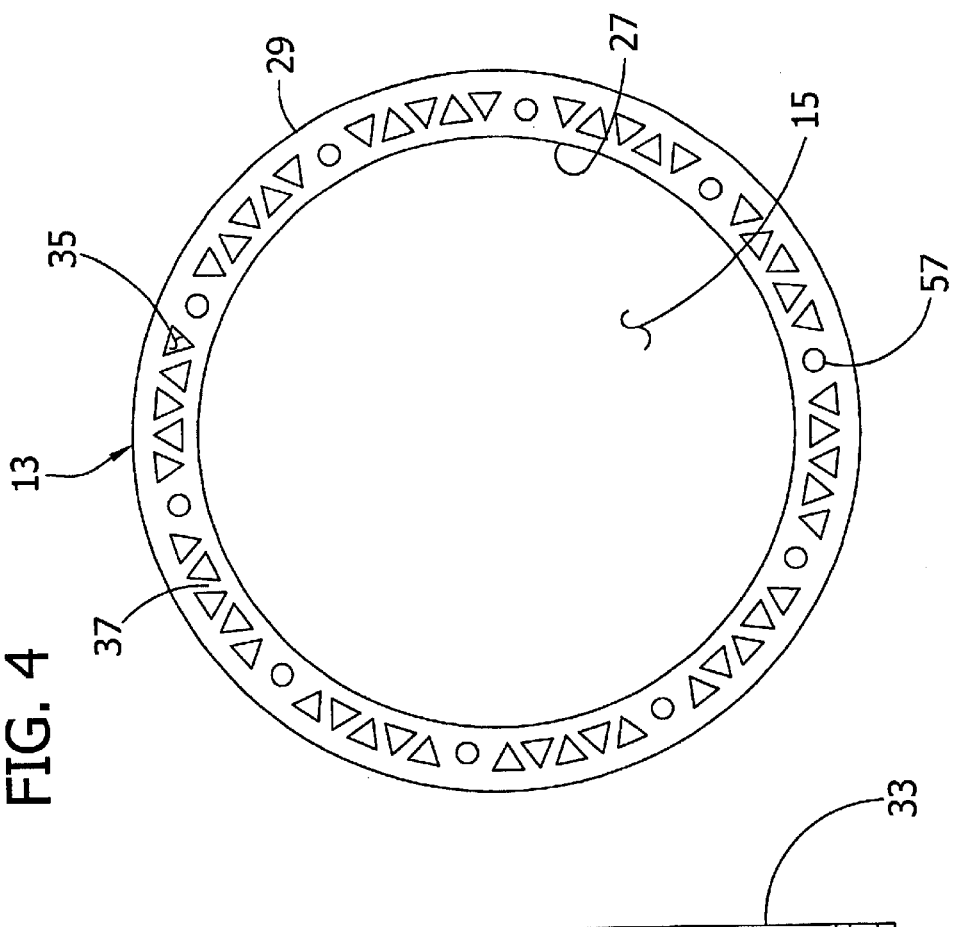
FIG. 4 is a top plan view of an alternate embodiment of the jacket body.

In accordance with one aspect of the present invention, each flow passage 35 has a radial cross sectional shape (as shown in FIGS. 2, 2A and 4) defined entirely by three or more substantially linear sides 47, preferably no more than four and no less than three. For example, each passage 35 could have a rectangular shape such as shown in FIGS. 2 and 2A or a triangular shape as shown in FIG. 4. As used herein, "substantially linear sides" means generally straight sides connected at corners 49 each of which has a relatively small radius of curvature compared to the overall distance around the perimeter of the flow passage 35, and even more preferably relatively small compared to the lengths of the two sides 47 intersecting to form the corner (See FIG. 2A). Preferably, the radius of curvature at a corner 49 is such that the perimeter of the flow passage 35 is not reduced by more than 25% compared to the perimeter of the same flow passage having precisely square corners. Even more preferably, the perimeter should not be reduced by more than 20%, still more preferably by no more than 10%, and most preferably by no more than about 5%. Further, it is preferred that the radius of curvature be less than about 0.125 in, more preferably less than about 0.06 in, and even more preferably about 0.03 in. The use of substantially linear sides 47 increases the amount of area exposed to the coolant for greater heat transfer efficiency and decreases the amount of material needed to make the jacket body 13 for reduced weight and cost. The precise shape of each flow passage 35 (e.g., rectangular, triangular, etc.), the number of flow passages, and the radial cross sectional area of each flow passage, will vary, depending on cooling requirements, as will be understood by those skilled in this field.

The flow passages 35 of each group are preferably relatively closely spaced, forming cooling fins 37 between adjacent passages extending axially of the jacket body 13 from one end face 31 to the other end face 33, two opposing sides of each cooling fin being formed by the two adjacent sides 47 of two adjacent flow passages (FIGS. 2, 2A and 4). If the flow passages 35 are rectangular in shape, as shown in FIGS. 2 and 2A, these fins 37 will also be generally rectangular in radial cross section. The spacing between adjacent flow passages 35 of each group, i.e., the thickness of each fin 37 defined by two adjacent flow passages, will vary, depending on such factors as the material used, flow rate, coolant selection, fin length (in the radial direction relative to the body 13), heat dissipation, etc. Of course, if the flow passages 35 have a shape or shapes other than rectangular (which includes a square shape), the shape(s) of the fins 37 will also be other than rectangular.

The first end cap 21 (shown as the upper end cap in FIG. 1) is preferably a cast metal part, also of aluminum for example, having an annular end wall 61 with a circular inner edge 63 defining a central opening 65 therein concentric with the jacket body 13, and an annular side wall 67 extending down from the end wall (FIGS. 1 and 5–8). An inner annular rib or flange 69 extends down from the end wall 61 generally concentric with the side wall 67 and is spaced radially inward from the side wall to form an annular downwardly opening groove 71 around the cap 21. The second end cap 23 is similarly formed with an annular end wall 81 having a central opening 83 coaxial with central opening 65 in the opposing cap 21, an annular side wall 85 extending up from the end wall, and an inner annular rib or flange 87 generally concentric with the side wall 85 and spaced radially inward from the side wall to form an annular upwardly opening groove 89 around the cap 23 (FIGS. 1 and 9–11).

As shown in FIG. 1, the end caps 21, 23 and jacket body 13 are assembled so that the upper end face 31 of the body is in sealing contact with downwardly facing surfaces of the side wall 67 and the inner annular flange 69 to close the open side of the groove 71 and thus form an annular upper conduit 73 around the circumference of the upper cap 21. Similarly, the lower end face 33 of the body 13 is in sealing contact with upwardly facing surfaces of the inner annular flange 87 and side wall 85 of the lower cap 23 to close the open side of the groove 89 to form an annular lower conduit 91 around the circumference of the lower cap. The assembly of the body 13 and the two end caps 21, 23 places the flow passages 35 in the jacket body in fluid communication with the two conduits 73, 91 in the end caps. Preferably, the outside diameter of the jacket body 13 is approximately the same as the outside diameter of the side walls 67, 85 of the caps 21, 23, so that the fit between the parts is flush. The end caps 21, 23 are secured to the jacket body 13 by suitable threaded fasteners 51 extending through clearance holes 53, 55 in the caps 21, 23 into tapped bores 57 in the body. Other means for securing the parts together may be used (e.g., welding).

Figure 5:
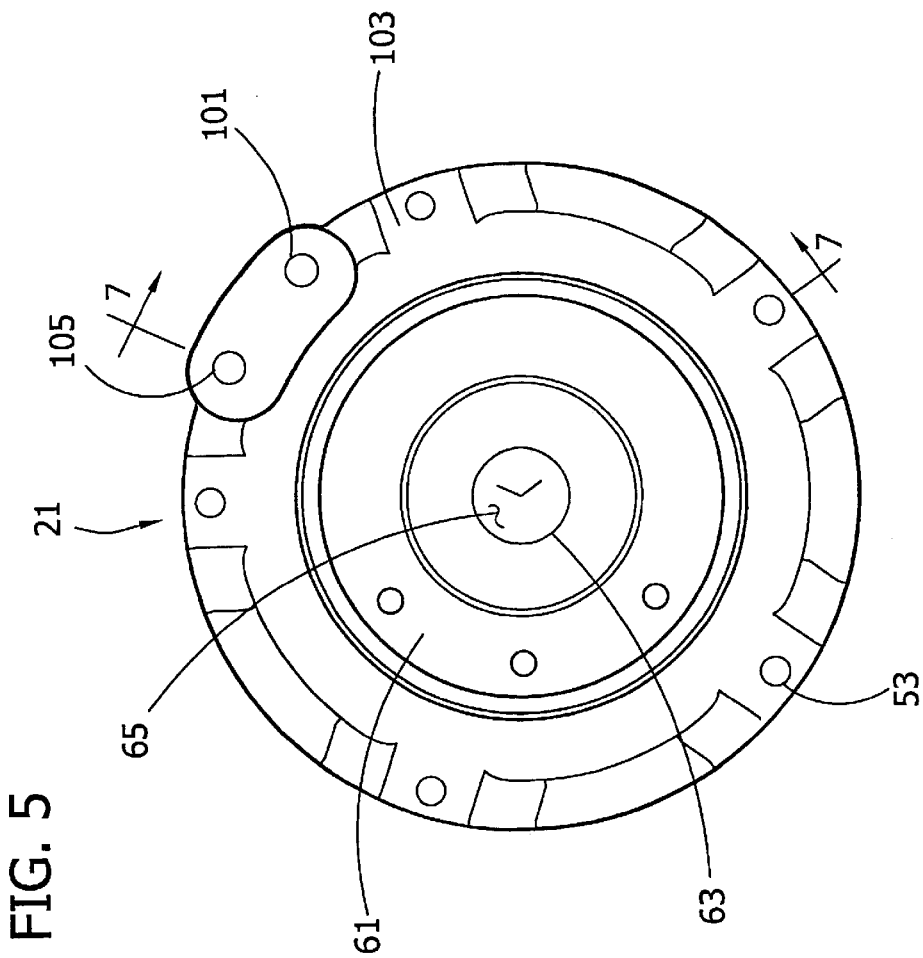
FIG. 5 is a top plan view of a first end cap of the assembly.
Figure 6:
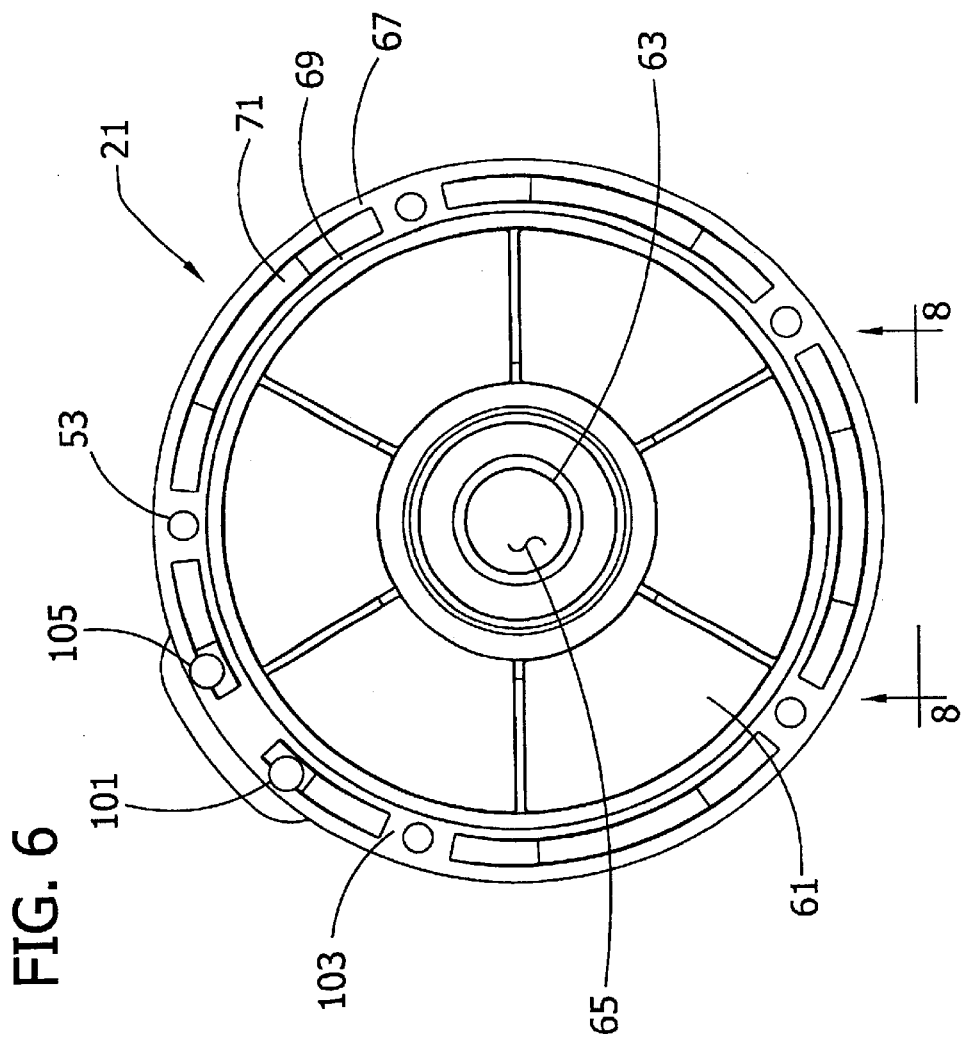
FIG. 6 is a bottom plan view of the first end cap.
Figure 8:
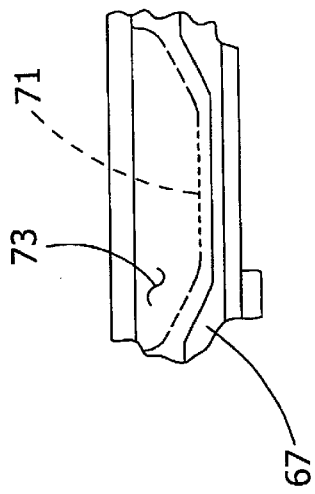
FIG. 8 is a sectional view taken on line 8—8 of FIG. 6.
Figure 7:
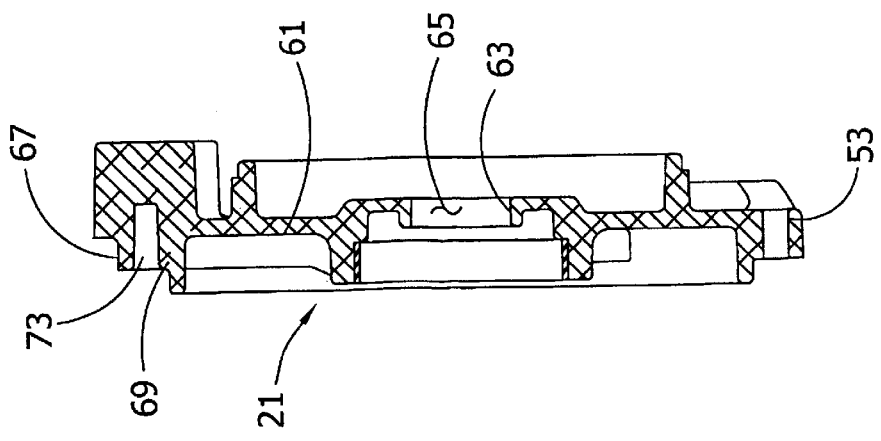
FIG. 7 is a sectional view taken along line 7—7 of FIG. 5.

The first end cap 21 has an inlet 101 for connection to a source of liquid coolant (e.g., a mixture of water and ethylene glycol) circulating in a suitable heat exchange circuit (not shown) for flow of liquid coolant into the upper annular conduit 73, and an outlet 105 for exit of coolant from the conduit (FIGS. 5 and 6). In the illustrated embodiment, the inlet 101 and outlet 105 are located relatively close together, since coolant flows along only one serpentine path starting at the inlet and ending at the outlet and extending around substantially the entire circumference of the jacket body 13 (e.g., preferably around at least 75–100% of the overall circumferences). However, this arrangement may vary, as previously mentioned.

Figure 12:
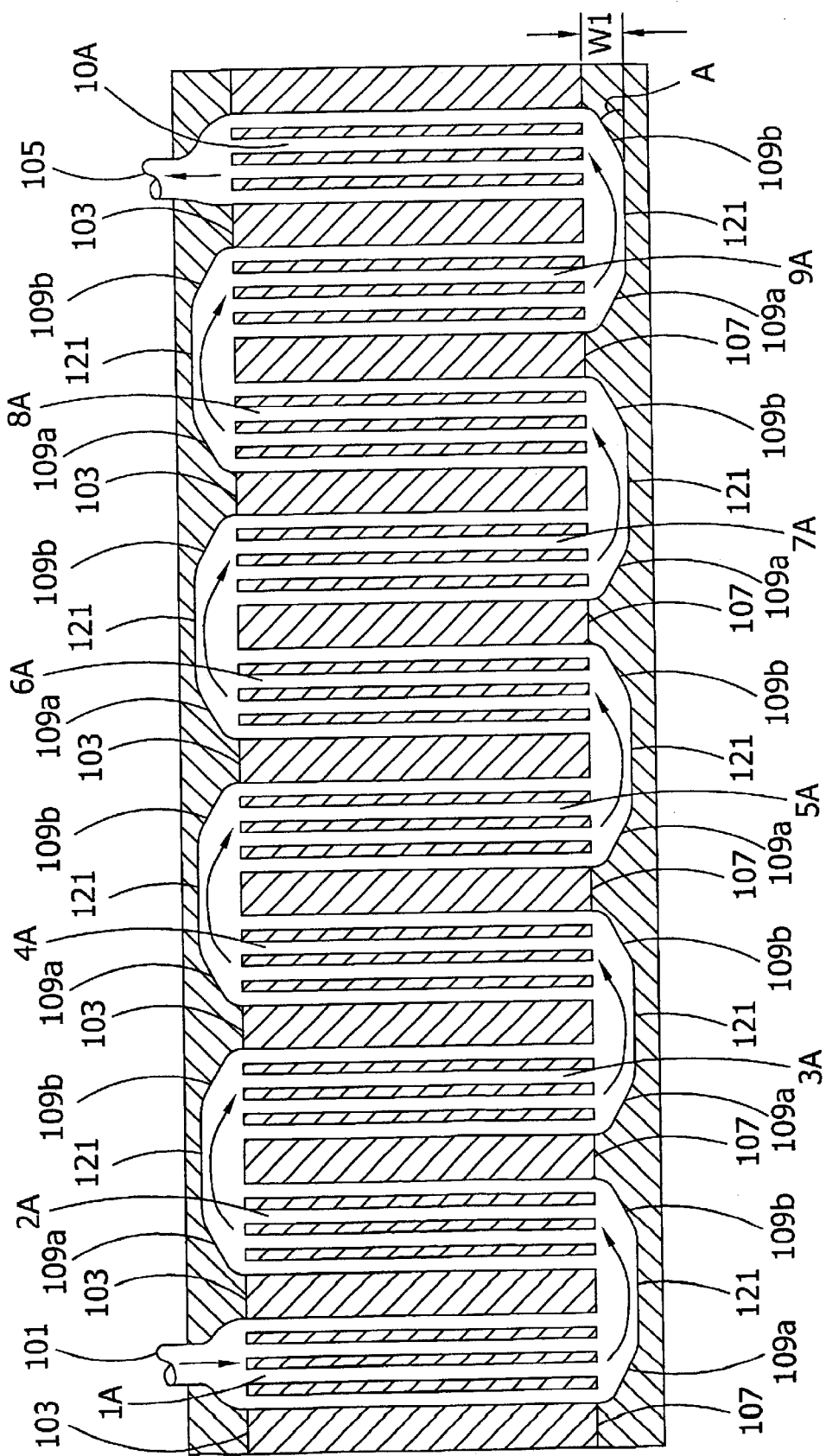
FIG. 12 is a schematic view illustrating the flow path of coolant through the cooling jacket.

The first and second end caps are formed with a number of barriers, designated 103 and 107 respectively, extending across respective conduits 73, 91 to prevent the flow of fluid therepast. (While these barriers are shown to be integral with the end caps 21, 23, they could be separate from the end caps, or even part of the body 13.) The barriers 103, 107 provide for the aforementioned serpentine flow through the cooling jacket 11, as will be described. To effect this flow, the end caps 21, 23 should be oriented relative to one another so that the barriers 107 in the annular conduit 91 formed by the second (e.g., lower) end cap 23 are circumferentially offset relative to the barriers 103 in the annular conduit 73 formed by the first (e.g., upper) end cap 21. This offset should be by an amount equal to one-half the spacing between the barriers 103, 107, or the width of one group of flow passages 35. The arrangement is such that coolant entering the inlet 101 flows into the conduit 73 of the first end cap 21 and is directed by an adjacent barrier 103 to flow along a serpentine flow path around the body 13 of the jacket 11 to the outlet 105 where it exits the jacket. FIG. 12 is a schematic illustrating the path of coolant flow through the jacket 11 from the inlet 101 to the outlet 105. As an aid to explanation, the various axial sections of the serpentine flow paths have been numbered 1A–10A. Coolant entering the inlet 101 is directed to flow along the serpentine path comprising sections 1A–10A, in sequence until it exits the outlet 105. The inlet pressure and flow rate through the cooling jacket 11 will vary depending on the required rate of heat transfer and other factors, as will be understood by those skilled in this field.

To maintain a more uniform static pressure across each group of flow passages 35, thereby promoting a more even distribution of cooling liquid through all of the flow passages of each group, the end caps may have ramps 109 (shown schematically in FIG. 12) positioned in the conduits 73, 91 at locations corresponding to the inlet and outlet ends of the sections 1A–10A of the serpentine coolant flow path. Preferably, two ramps 109 are provided for each pair of adjacent flow sections, the first ramp (109a in FIG. 12) being located for directing flow from the outlet end on one section generally toward the inlet end of the adjacent flow section, and a second ramp (109b) for directing flow from the first ramp into the inlet end of the adjacent flow section. These ramps 109a, 109b preferably slope in opposite directions and are formed by sloping surfaces of a respective annular conduit 73, 91 connected by a non-sloping surface 121 of the conduit. Each ramp 109 extends in a respective conduit 73, 91 across substantially the entire width of a respective flow section 1A–10A (this portion of the conduit being referred to as a "header region"). The ramps 109 help to create a more uniform fluid static pressure throughout respective header regions, resulting in a more even distribution of flow through the passages 35 of each section. (Without the ramp, fluid speed and static pressure would tend to vary across a header region, resulting in more flow through some passages and less through others.) The ramps 109 should be of suitable shape and at a suitable angle to maintain fluid flow speed at a substantially constant value throughout the header region. The ramps are preferably formed as integral parts of the end caps 21, 23, but they could be formed as separate parts.

By way of example, but not limitation, a cooling jacket of the present invention may have the following approximate dimensions: inside diameter of the jacket body 13—8.85 in.; axial length of jacket body 13—8.50 in.; number of flow passages 35 per section of serpentine path—four; circumferential extent of each section of serpentine path —24 degrees; circumferential extent of each ramp 109 15 degrees; effective width of the conduit 73, 91 at W1 in FIG. 12—1.0 in.; inclination angle A of ramp 109—25 degrees.

The rotor and shaft assembly 25 is of conventional construction and comprises a rotor 39 mounted in the stator 17 on a shaft 41 rotatable in bearings 43 on the end caps 21, 23, the shaft extending through the concentric central openings 65, 83 in the caps (FIG. 1). A sensor assembly, generally designated 45, is attached by suitable fasteners to one of the end caps (the upper end cap 21 as shown in the drawings) for sensing the angular position of the shaft 41 and rotor 39 thereon.

In use, coolant flows through the inlet 101 of the jacket 11 and is directed along the serpentine path previously described before exiting the jacket through the outlet 105. As the coolant flows along these paths, it contacts the body 13 and convects heat away from it, thereby cooling the body and the stator 17 encircled by the jacket 11. This convection is particularly efficient due to the aforementioned shapes of the cooling passages 35 having substantially linear sides. Due to the fact that the coolant flows substantially unrestricted through the flow passages 35, the pressure drop in the flow passages is relatively low. The velocity of the coolant preferably should be sufficient for turbulent flow and greater efficiency of heat transfer. The ramps 109 further ensure a substantially uniform distribution of flow through all flow passages 35 of any given section for increased thermal efficiency. It will be noted that while the temperature of the body 13 of the cooling jacket 11 may reach relatively high temperatures during operation of the electric machine, the temperatures should not be so high as to cause the body of the jacket to expand to a point where the fit between the stator 17 and the body becomes loose.

The cooling jacket design described above could be modified to have different numbers, shapes and arrangements of flow passages 35 to provide for serpentine flow through the jacket. For example, each flow path could have more or less parallel sections than the number of sections shown in FIG. 12. Further, the inlet and outlet points could be varied to vary the number of serpentine flow paths. For example, there could be one, two or more serpentine flow paths. It is also contemplated that the path of cooling flow could be other than serpentine. The particular flow path arrangement and configuration used for a given application will depend on size, heat transfer requirements, and possibly other factors.

It will further be noted that the cooling jacket of this invention can be used for cooling electric machines operating at high speeds and generating substantial heat, but that the cooling jacket is not limited to such machines.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cooling jacket for cooling the stator of an electric machine, said jacket comprising
   a jacket body having co-axial inner and outer surfaces, the inner surface defining a generally cylindric cavity for receiving said stator so that the stator is in heat transfer contact with said inner surface,
   axial flow passages in the body for the flow of coolant therethrough, each flow passage having a radial cross sectional shape defined entirely by three or more substantially linear sides.

2. A cooling jacket as set forth in claim 1 wherein each flow passage has a rectangular radial cross sectional shape.

3. A cooling jacket as forth in claim 1 wherein each flow passage has a triangular radial cross sectional shape.

4. A cooling jacket as set forth in claim 1 wherein said jacket body is a monolithic extruded metal part.

5. A cooling jacket as set forth in claim 1 wherein said barriers arc configured for directing said coolant along a single serpentine path from the inlet to the outlet.

6. A cooling jacket as set forth in claim 5 wherein said single path comprising a plurality of parallel sections extending axially of the cooling jacket body and connected by said conduits, each section of the path comprising a group of said flow passages.

7. A cooling jacket as set forth in claim 1 further comprising axial heat transfer fins between said cooling passages, each such fin having a pair of spaced apart opposing sides extending axially of said body defined by a pair of adjacent substantially linear sides of two adjacent flow passages.

8. A cooling jacket as set forth in claim 7 wherein each of said heat transfer fins has a thickness corresponding to the spacing between said two adjacent flow passages.

9. A cooling jacket as set forth in claim 1 wherein said path comprises a plurality of parallel flow sections extending axially of the cooling jacket body between said conduits, each flow section of the path comprising a group of said flow passages and each section having an inlet end for entry of coolant into a respective group of flow passages and an outlet end for exit of coolant from the flow passages of said group, and ramps in said conduits extending across the inlet and outlet ends of said parallel flow sections for maintaining a substantially uniform static pressure in said conduit across the flow passages of each flow section.

10. A cooling jacket as set forth in claim 1 wherein the substantially linear sides of each flow passage intersect at rounded corners, each corner having a small radius of curvature such that the perimeter of the flow passage is not reduced by more than 25% compared to the same flow passage having square corners.

11. A cooling jacket as set forth in claim 1 wherein the substantially linear sides of each flow passage intersect at rounded corners, each corner having a small radius of curvature such that the perimeter of the flow passage is not reduced by more than 20% compared to the same flow passage having square corners.

12. A cooling jacket as set forth in claim 1 wherein the substantially linear sides of each flow passage intersect at rounded corners, each corner having a small radius of curvature such that the perimeter of the flow passage is not reduced by more than 10% compared to the same flow passage having square corners.

13. A cooling jacket as set forth in claim 1 wherein the substantially linear sides of each flow passage intersect at rounded corners, each corner having a small radius of curvature such that the perimeter of the flow passage is not reduced by more than about 5% compared to the same flow passage having square corners.

14. A cooling jacket as set forth in claim 1 wherein said radius of curvature is less than about 0.06 in.

15. A cooling jacket as set forth in claim 1 wherein said radius of curvature is less than about 0.03 in.

16. A cooling jacket for cooling the stator of an electric machine, said jacket comprising a jacket body having co-axial inner and outer surfaces, the inner surface defining a generally cylindric cavity for receiving said stator so that the stator is in heat transfer contact with said inner surface, axial flow passages in the body for the flow of coolant therethrough, each flow passage having a radial cross sectional rectangular shape defined by four substantially linear sides joined at four corners, each corner having a small radius of curvature such that the perimeter of the flow passage is not reduced by more than 25% compared to the perimeter of the same flow passage having square corners, a first end cap connected to one end of the cooling jacket body and defining an annular conduit around the body in fluid communication with said flow passages, a second end cap connected to an opposite end of the cooling jacket body and defining an annular conduit around the body in fluid communication with said flow passages, an inlet on one of the end caps for flow of coolant into a respective conduit, an outlet on one of the end caps for flow of coolant out of a respective conduit, and barriers in the conduits for directing said coolant along a single serpentine path from the inlet through the flow passages to the outlet.

17. A cooling jacket as set forth in claim 16 wherein said path comprises a plurality of parallel flow sections extending axially of the cooling jacket body between said conduits, each flow section of the path comprising a group of said flow passages and each section having an inlet end for entry of coolant into a respective group of flow passages and an outlet end for exit of coolant from the flow passages of said group, and ramps in said conduits extending across the inlet and outlet ends of said parallel flow sections for maintaining a substantially uniform static pressure in said conduit across the flow passages of each flow section.

18. A cooling jacket as set forth in claim 16 wherein said radius of curvature is such that the perimeter of the flow passage is not reduced by more than 20% compared to the same flow passage having square corners.

19. A cooling jacket as set forth in claim 16 wherein said radius of curvature is such that the perimeter of the flow passage is not reduced by more than 10% compared to the same flow passage having square corners.

20. A cooling jacket as set forth in claim 16 wherein said radius of curvature is such that the perimeter of the flow passage is not reduced by more than about 5% compared to the same flow passage having square corners.

21. A cooling jacket as set forth in claim 16 wherein said radius of curvature is less than about 0.06 in.

22. A cooling jacket as set forth in claim 16 wherein said radius of curvature is less than about 0.03 in.

23. A cooling jacket for cooling the stator of an electric machine, said jacket comprising a jacket body having co-axial inner and outer surfaces, the inner surface defining a generally cylindric cavity for receiving said stator so that the stator is in heat transfer contact with said inner surface, axial flow passages in the body for the flow of coolant therethrough, a first end cap connected to one end of the cooling jacket body and defining an annular conduit around the body in fluid communication with said flow passages, a second end cap connected to an opposite end of the cooling jacket body and defining an annular conduit around the body in fluid communication with said flow passages, an inlet on one of the end caps for flow of coolant into a respective conduit, an outlet on one of the end caps for flow of coolant out of a respective conduit, barriers in the conduits for directing fluid along a path from the inlet through the flow passages to the outlet, said path comprising a plurality of parallel flow sections extending axially of the cooling jacket body between said conduits, each flow section of the path comprising a group of said flow passages and each section having an inlet end for entry of coolant into a respective group of flow passages and an outlet end for exit of coolant from the flow passages of said group, and ramps in said conduits extending across the inlet and outlet ends of said parallel flow sections for maintaining a substantially uniform static pressure in said conduits across the flow passages of each flow section.

24. A cooling jacket as set forth in claim 23 wherein said ramps comprise a first ramp for directing flow from the outlet end of one flow section generally toward the inlet end of an adjacent flow section, and a second ramp for directing flow from the first ramp into the inlet end of said adjacent flow section.

25. A cooling jacket as set forth in claim 24 wherein said first and second ramps are inclined in substantially opposite directions.

26. A cooling jacket as set forth in claim 25 wherein said first and second ramps are formed by sloping surfaces of a respective annular conduit.

27. A cooling jacket for cooling the stator of an electric machine, said jacket comprising

- a jacket body having co-axial inner and outer surfaces, the inner surface defining a generally cylindric cavity for receiving said stator so that the stator is in heat transfer contact with said inner surface,
- axial flow passages in the body for the flow of coolant therethrough,
- a first end cap connected to one end of the cooling jacket body and defining an annular conduit around the body in fluid communication with said flow passages,
- a second end cap connected to an opposite end of the cooling jacket body and defining an annular conduit around the body in fluid communication with said flow passages,
- an inlet on one of the end caps for flow of coolant into a respective conduit,
- an outlet on one of the end caps for flow of coolant out of a respective conduit,
- barriers in the conduits for directing all fluid entering the inlet to flow through the flow passages along only one serpentine path starting at the inlet and ending at the outlet and extending around substantially the entire circumference of the jacket body, said path comprising a plurality of parallel flow sections extending axially of the cooling jacket body between said conduits, each flow section of the path comprising a group of said flow passages and each section having an inlet end for entry of coolant into a respective group of flow passages and an outlet end for exit of coolant from the flow passages of said group.

* * * * *

UNITED STATES PATENT AND TRADEMARK OFFICE
CERTIFICATE OF CORRECTION

PATENT NO. : 6,727,611 B2
DATED : April 27, 2004
INVENTOR(S) : Peter K. Bostwick It is certified that error appears in the above-identified patent and that said Letters Patent is hereby corrected as shown below:

Column 6,
Line 47, replace the period with a comma; and
Line 48, add:
-- a first end cap connected to one end of the cooling jacket body and defining an annular conduit around the body in fluid communication with said flow passages, a second end cap connected to an opposite end of the cooling jacket body and defining an annular conduit around the body in fluid communication with said flow passages, an inlet on one of the end caps for flow of coolant into a respective conduit, an outlet on one of the end caps for flow of coolant out of a respective conduit, and barriers in the conduits for directing fluid along a path from the inlet through the flow passages to the outlet. --
Line 55, replace "arc" with -- are --

Signed and Sealed this

Nineteenth Day of July, 2005

JON W. DUDAS
*Director of the United States Patent and Trademark Office*